United States Patent
Kato

(10) Patent No.: US 6,928,112 B2
(45) Date of Patent: *Aug. 9, 2005

(54) SIGNAL CODING METHOD, SIGNAL CODING APPARATUS, SIGNAL RECORDING MEDIUM, AND SIGNAL TRANSMISSION METHOD

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/032,913

(22) Filed: Dec. 29, 2001

(65) Prior Publication Data

US 2002/0054637 A1 May 9, 2002

Related U.S. Application Data

(63) Continuation of application No. 09/061,581, filed on Apr. 16, 1998.

(30) Foreign Application Priority Data

Apr. 30, 1997 (JP) .............................. 9-113141

(51) Int. Cl.[7] .............................................. H04B 1/66
(52) U.S. Cl. ............................ 375/240.04; 375/240.02; 375/240.05; 375/240.07; 375/240.08; 375/240.24; 375/240.26; 382/239; 382/251; 382/250; 382/235
(58) Field of Search ...................... 375/240.04, 240.02, 375/240.05, 240.07, 240.08, 240.24, 240.26, 240.29, 240.16; 382/239, 251, 250, 235; 348/402, 404, 419; 386/112, 111, 109, 33

(56) References Cited

U.S. PATENT DOCUMENTS 5,231,484 A * 7/1993 Gonzales et al. ...... 375/240.04
5,604,602 A * 2/1997 Guillotel et al. ............... 386/33
5,642,165 A * 6/1997 Suzuki et al. .......... 375/240.02
5,686,962 A * 11/1997 Chung et al. ................ 348/402
5,719,986 A    2/1998 Kato et al.
5,949,956 A * 9/1999 Fukuda ........................ 386/112
6,167,087 A * 12/2000 Kato ...................... 375/240.03
6,363,114 B1 * 3/2002 Kato ...................... 375/240.04

FOREIGN PATENT DOCUMENTS

| EP | 0 540 961 | 5/1993 |
|---|---|---|
| EP | 0 541 302 | 5/1993 |
| EP | 0 655 867 | 5/1995 |
| EP | 0 660 612 | 6/1995 |
| EP | 0 742 674 | 11/1996 |
| EP | 0 751 687 | 1/1997 |
| EP | 0 797 359 | 9/1997 |
| EP | 0 836 329 | 4/1998 |

* cited by examiner

*Primary Examiner*—Shawn S. An
(74) *Attorney, Agent, or Firm*—Frommer Lawrence & Haug LLP; William S. Frommer

(57) ABSTRACT

The present invention enables to effectively coding a predetermined time length of a video signal with a variable bit rate at real time (one-path) into a total coding bit amount of a constant data capacity.

A coding difficulty calculator 13 determines a coding difficulty of an input signal for each unit time. An allocation bit amount calculator 14 interrelates an allocation sign amount with a coding difficulty for each unit time standardized in advance using an ordinary input signal of the type to which the input signal belongs, so as to obtain a reference value of the allocation sign amount for each unit time interrelated with the coding difficulty supplied from the coding difficulty calculator 13. This reference value of the allocation sign amount is modified by a controller 15 into an actual allocation sign amount, according to which the input signal is coded by a moving picture image coding apparatus 18, so as to create a coded data.

12 Claims, 10 Drawing Sheets

SIGNAL CODING METHOD, SIGNAL CODING APPARATUS, SIGNAL RECORDING MEDIUM, AND SIGNAL TRANSMISSION METHOD

This application is a continuation of U.S. application Ser. No. 09/061,581 filed Apr. 16, 1998.

BACKGROUND OF THE INVENTION

1. Field of the Invention

The present invention relates to a signal coding apparatus, a signal coding method, a signal recording medium, and a signal transmission methods with high-efficiency coding of a digital signal at a transmission side and in particular, to a signal coding apparatus, a signal coding method, a signal recording medium, and a signal transmission method for coding a moving picture signal with a variable bit rate control.

2. Description of the Prior Art

As a digital video signal has an extremely great data amount, when recording it for a long time on a recording medium having a small storage capacity, it is indispensable to provide means for coding the video signal with a high efficiency. In order to answer such a request, there have been proposed high-efficiency coding methods utilizing a video signal correlation. One of the methods is the MPEG. This MPEG (Moving Picture Image Coding Experts Group) has been proposed as a standard method after discussion in the ISO-IEC/JTC1/SC2/WG11. The MPEG is a hybrid method using a motion compensative coding in combination with the discrete cosine transform (DCT). In this MPEG method, firstly, a video signal difference between frames is determined to remove a redundancy in the temporal axis and then the discrete cosine transform is used to remove a redundancy in the spatial axis thus enabling to encode a video signal with a high efficiency.

In general, a video signal is not stationary but a picture information amount changes as the time lapses. For this, when a variable bit rate coding is used, a higher quality of picture can be obtained compared to a constant bit rate coding if an identical code amount is involved.

For example, a video signal recorded on a so-called DVD-video is normally coded by a variable bit rate coding of two-path type. This two-path method is, for example, disclosed in the Specification and the drawings of Japanese Patent Application 7-3313348 filed by the applicant of the present invention.

Here, FIG. 1 is a block diagram showing a configuration example of a moving picture coding apparatus using a two-path type variable bit rate coding method. FIG. 2 is a flowchart showing a two-path type variable bit rate coding procedure. With reference to this flowchart, explanation will be given on the operation of the block diagram of FIG. 1.

Firstly, in step 301 of FIG. 2, a moving picture signal from a terminal 200 is supplied to a coding difficulty calculator 201 which calculates a coding difficulty of an input image per unit time. Here, the calculation of the coding difficulty is carried out by a DCT coefficient is quantized with a fixed quantization alone in an MPEG method coding apparatus so as to calculate a generated code amount per a unit time. The aforementioned unit time is, for example, in the order of 0.5 seconds. The coding difficulty 'd' calculated is supplied to an allocation bit amount calculator 202.

Next, in step 302, after completion of the calculation of the coding difficulty up to the last input moving picture image signal, the allocation bit amount calculator 202 calculates an allocation bit amount for the input image per unit time according to the entire coding difficulty and the coding bit amount which can be used. For example, the allocation (target) bit amount per unit is calculated by distributing the total amount of the usable coding bits according to the coding difficulty for each unit time.

It should be noted that a delay element 203 is used to delay input of the input moving picture image signal to a moving picture image coding apparatus 204 until the processing of the coding difficulty calculator 201 and the allocation bit amount calculator 202 is complete for the entire time length of the input picture image.

Next, in step 303, the moving picture coding apparatus 204 encodes the input moving picture image per unit time into the allocation amount calculated in step 302.

The processing of step 301 and step 302 constitutes a first path processing in which the coding difficulty and the allocation bit amount are calculated. The processing of step 303 constitutes a second path processing which carries out the actual moving picture image coding. In this two-path method, there is a merit that it is possible to effectively use a usable coding bit amount, but there is also a defect that the processing requires about twice time of the time length of the moving picture image sequence, and is not appropriate for a real-time processing.

In order to reduce this processing time, a one-path type variable bit rate coding method is disclosed in the Specification and drawings of Japanese Patent Application 7-311418 filed by the applicant of the present invention.

A moving picture image coding apparatus employing the one-path type variable bit rate coding method has an identical configuration as that of the block diagram shown in FIG. 1. However, the control method of the allocation bit amount calculator 202 and the delay element 203 is different in the one-path type from the two-path type. FIG. 3 is a flowchart showing the one-path type variable bit rate coding processing. With reference to this flowchart, explanation will be given on the operation of the block diagram of FIG. 1.

In step 4-1 of FIG. 3, a moving picture image signal is supplied to the coding difficulty calculator 201 in FIG. 1, so as to calculate a coding difficulty of the input image per unit time. The aforementioned unit time is, for example, in the order of 0.5 seconds.

Next, in step 402, an encoding difficulty 'd' is related beforehand to an allocation bit amount 'b' per unit time when carrying out a variable bit rate coding of a reference moving picture image sequence with a predetermined average bit rate. Here, the total of the allocation bit amount per unit time for the reference moving picture image sequence is set to a value equal to or below a storage capacity of a target recording medium. This relationship between the coding difficulty 'd' and the allocation bit amount 'b' is shown in FIG. 4.

In FIG. 4, the horizontal axis represents an appearance probability h(d) of a coding A difficulty 'd' with the reference moving picture image sequence. An allocation bit amount for an arbitrary coding difficulty is calculated according to the function b(d). This relationship can be obtained empirically by coding a large number of moving picture image sequences (for example, a movie) with a predetermined average bit rate and evaluating the obtained picture quality. Thus, this relationship is a general one which can be applied to most of the sequences in this world. According to this relationship of FIG. 4, an allocation bit amount 'b' is given for a coding difficulty 'b' per unit time of the input image from the terminal 200.

In this one-path type, the delay element 203 is provided so as to delay the input of an input image signal to the moving picture coding apparatus 204 by the unit time until the processing in the coding difficulty calculator 201 and in the allocation bit amount calculator 202 is complete for the input image of the unit time length.

Next, in step 403, the moving picture coding apparatus 204 encodes the input moving picture image per unit time into the allocation bit amount supplied, in accordance with this, from the allocation bit amount calculator 202.

In such a one-path method, according to the input of the image signal, it is possible to carry out a variable bit rate coding with an optimal allocation bit amount according to the coding difficulty almost at real time.

Although the relationship of FIG. 4 can be applied to almost all the moving picture sequence, there are also some special sequences which cannot be treated by this relationship. There is a case when the total bit amount generated in the moving picture coding apparatus 204 exceeds a usable total bit amount, i.e., the moving picture sequence cannot be contained in the target recording medium.

In order to encode a predetermined time length of a moving picture sequence with a variable bit rate at a real time so as to be recorded in a recording medium of a predetermined storage capacity, it is impossible to use the two-path method. Moreover, although the one-path method can encode almost all the moving picture sequences at a real time with a variable bit rate so that a predetermined time length of a sequence is contained in a recording medium of a predetermined storage capacity, there is also a special sequence in which the total coding bit amount exceeds a usable total bit amount, i.e., a predetermined time length of sequence may not be contained in the recording medium.

SUMMARY OF THE INVENTION

It is therefore an object of the present invention to provide a moving picture encoding method, a moving picture encoding apparatus, and a coded signal recording medium containing a data recorded by the coding apparatus which guarantee to encode a predetermined time length of moving picture sequence at real time with a variable bit rate so that the total coded bits generated can be contained in a recording medium having a predetermined storage capacity.

In order to achieve the aforementioned object, according to the present invention, an allocation data (e.g., bit) amount is interrelated with a coding difficulty for each unit time standardized in advance using an ordinary input signal of the type to which an input signal belongs, so as to determine a coding difficulty of the input signal for each unit time. For the coding difficulty of the input signal for each time unit, a reference value of the interrelated allocation data amount is determined for said each unit time. The reference value of the allocation data amount is modified into an actual allocation data amount. According this actual allocation data amount, the input signal is coded for said each unit time, so as to create a coded data. Thus, it is possible to carry out coding with an optimal allocation data amount according to a complexity of an input signal at real time.

The aforementioned modification of the allocation data amount into an actual allocation data amount is carried out by controlling the actual allocation data amount so that a total of a generated bit amount generated when a time length of signal which can be recorded on a recording medium is equal to or below a bit amount available in the recording medium for signal recording.

More specifically, in case of coding an input signal for each unit time with a constant allocation bit amount b av, a total B av of allocation bit amounts up to now is compared to a total B gen of actually generated coding bit amount up to now. If a value (B av−B gen) is positive, it is allowed to assign an allocation bit amount equal to or above b av, so as to guarantee the aforementioned. Here, the b av is given by the following equation.

That is, b av=T GOP×BV/T SEQ, wherein BV is a bit amount available in a signal recording medium for a moving picture image recording; T SEQ is a moving picture image sequence which can be recorded on the signal recording medium; and T GOP is a unit time length.

According to the information used when modifying the aforementioned allocation data amount reference value into an actual allocation data amount, the input signal is subjected to a pre-filter processing and the processed signal is coded, thus enabling the signal coding deterioration to be made less remarkable. More specifically, when suppressing the actual allocation data amount below the allocation data amount reference value, an input image is subjected to a low-pass filter processing, thus enabling the coding deterioration of the image to be made less remarkable.

When coding a signal and recording the coded signal onto a recording medium in several times, the value (B av−B gen) or a value equivalent to the value is recorded on the recording medium, so that when a signal is recorded in an empty area of the recording medium next time, prior to signal recording, the value (B av−B gen) or the value equivalent to the value is read out from the recording medium, according to which value an allocation bit amount of an input signal is calculated for each unit time. This enables to effectively use the storage capacity of the recording medium.

Moreover, for the case that the input signal is a moving picture image signal, the coding difficulty is determined according to an image characteristic information of the input image for each predetermined period of time and coding is carried out with an allocation data amount reflecting human visual characteristic based on the image characteristic information.

DETAILED DESCRIPTION OF PREFERRED EMBODIMENTS

Figure 1:
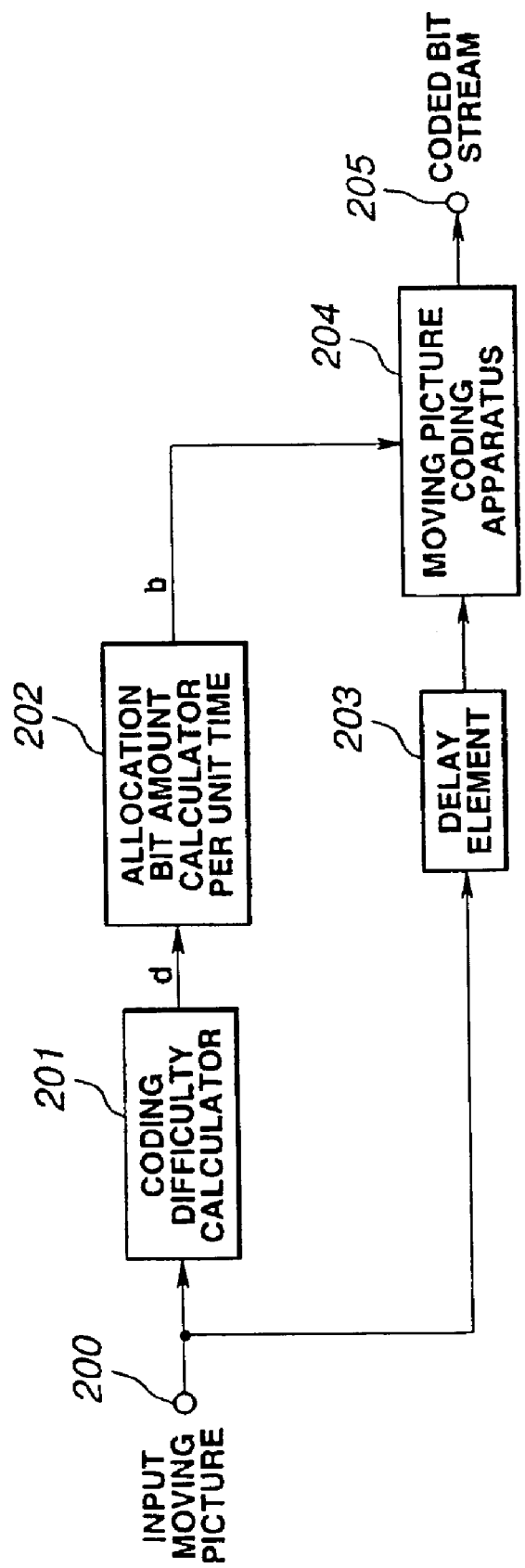
FIG. 1 is a block diagram showing a configuration example of a moving picture coding apparatus which employs a conventional two-path or one-path type variable bit rate coding method.
Figure 2:
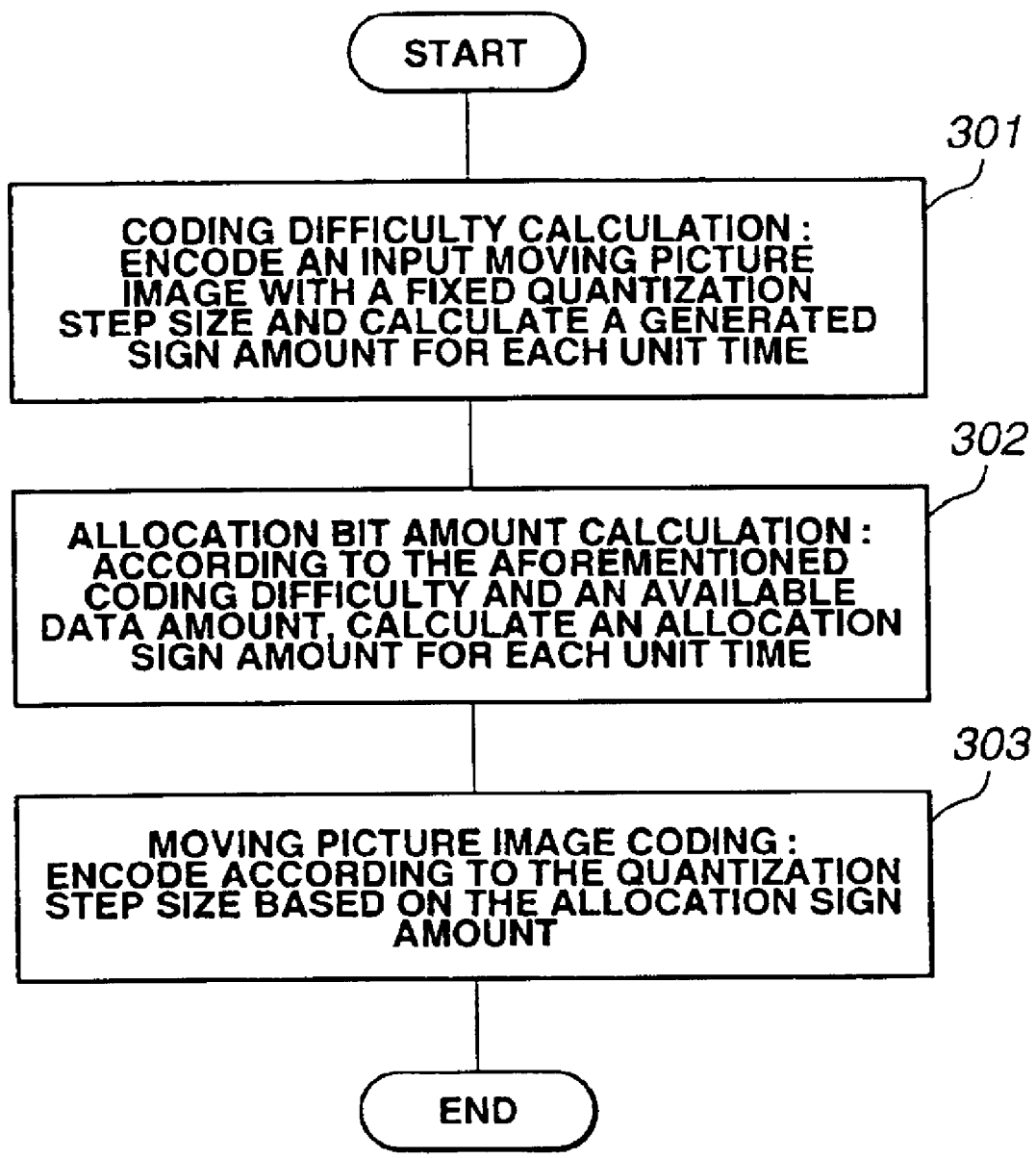
FIG. 2 is a flowchart for explanation of the variable bit rate coding processing by the conventional two-path method.
Figure 3:
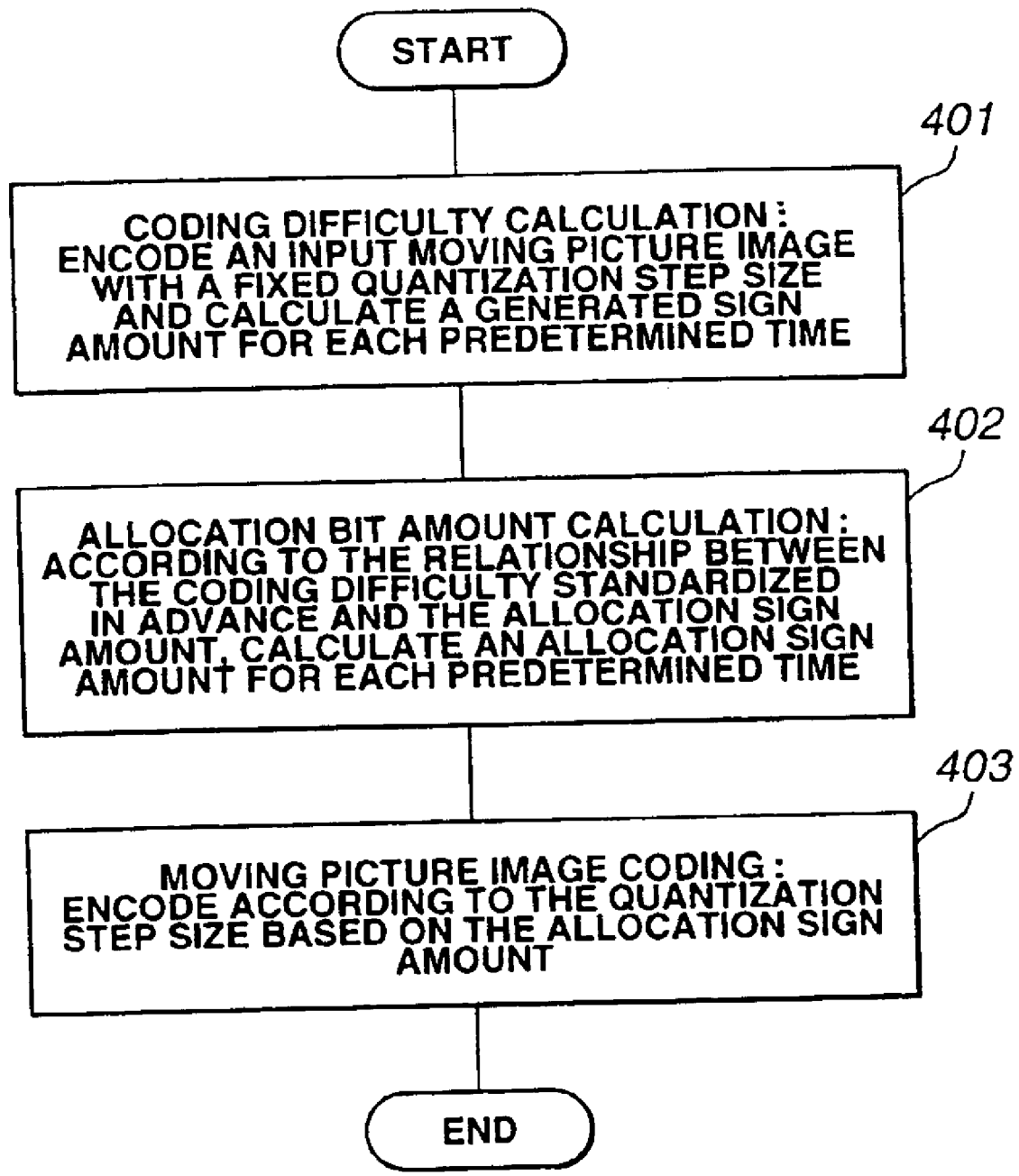
FIG. 3 is a flowchart for explanation of the variable bit rate coding processing by the conventional one-path method.

Hereinafter, description will be directed to a signal coding method and a signal coding apparatus according to the present invention and a recording medium containing a data recorded by the coding apparatus and a signal transmission method according to the present invention through preferred embodiments with reference to the attached drawings. Here, in the embodiments given below, explanation will be given on a case of a moving picture image signal coding for coding a moving picture image signal. Firstly, explanation will given on the moving picture coding method and apparatus according to an embodiment of the present invention with reference to FIG. 5.

Firstly, the entire configuration will be briefly explained. A moving picture image signal S1 supplied from a terminal 11 is introduced to a motion vector calculator 12. The motion vector calculator outputs a motion vector information (motion vector and its prediction residue) of the input moving picture image. Moreover, the moving picture image signal S1 and the aforementioned motion vector information are supplied to a coding difficulty calculator 13. The coding difficulty calculator 13 calculates a coding difficulty 'd' for every unit time of the input image S1. The coding difficulty 'd' is supplied to an allocation bit amount calculator 14. The allocation bit amount calculator 14 calculates an allocation bit amount reference value 'b' for coding the input image for every unit time. The allocation The allocation bit amount reference value 'b' is supplied to a controller 15. The controller 15 modifies the allocation bit amount reference value 'b' into an actual allocation bit amount 'bx' for output. Moreover, the controller 15 also outputs a processing information S5 of a pre-filter 17. A delay element 16 delays input of the moving picture image signal S1 to the pre-filter 17 by the unit time until completion of the processing in the coding difficulty calculator 14, the allocation bit amount calculator 14, and the controller 15 for the input image S1 of the unit time length. The input moving picture image signal S2 delayed by the delay element 16 is subjected to a processing in the pre-filter 17 according to the processing information S5 and a processed image signal S3 is outputted. A moving picture image coding apparatus 18 encodes the aforementioned processed image signal S3 of the unit time so as to be the allocation bit amount 'bx'. The moving picture coding apparatus 18 outputs a coded bit stream S6 and a generated bit amount 'gen' for each unit time. The coded bit stream S6 is outputted from a terminal 19.

Next, detailed explanation will be given on a specific example of the components of the block diagram in FIG. 5. The motion vector calculator 12 calculates a motion vector on the macro block basis (16×16 pixels, hereinafter referred to as MB) of the MPEG. A motion vector is detected by way of pattern matching between a reference frame and a current MB. That is, as shown in Equation (1) below, a sum Ef of absolute values of differences is obtained between a current MB signal A[i, j] and an MB signal F[x+1, y+j] referenced by an arbitrary motion vector (x, y).

$$Ef = \Sigma |A[i,j] - F[x+i, y+j]| (i=0 \text{ to } 15, j=0 \text{ to } 15) \quad (1)$$

The motion vector calculator 12 assumes coordinates (x, y) which minimizes the aforementioned Ef as a motion vector of the current MB (macro block) and outputs the Ef as a prediction residue of the motion vector.

Figure 5:
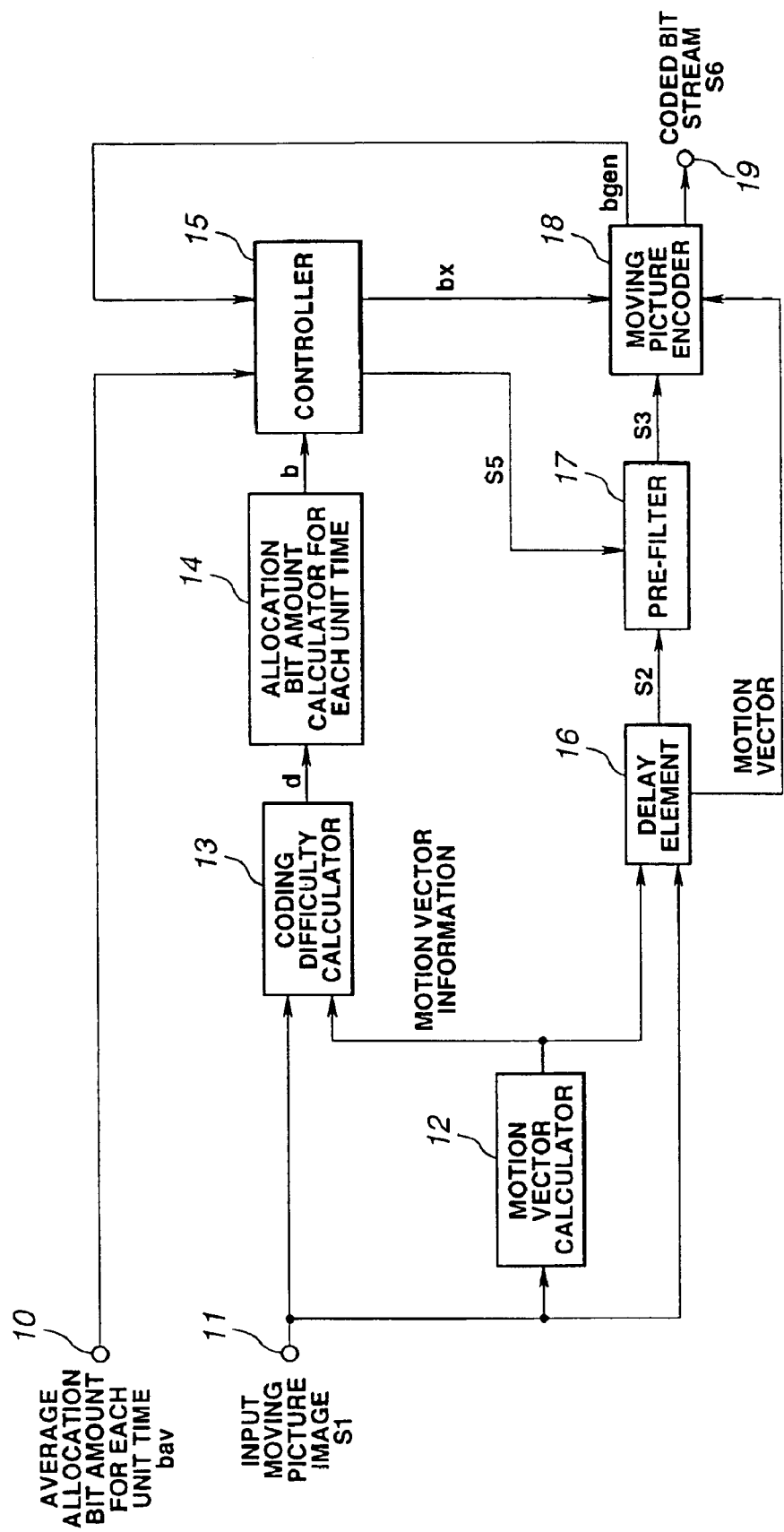
FIG. 5 is a block diagram showing a configuration example of a moving picture coding apparatus based on a moving picture coding method according to an embodiment of the present invention.

The coding difficulty calculator 13 in FIG. 5 calculates a coding difficulty which is a parameter of the information amount of the input image S1 of each unit time in which degree of coding deterioration is reflected. The aforementioned unit time is, for example, about 0.5 seconds.

Figure 6:
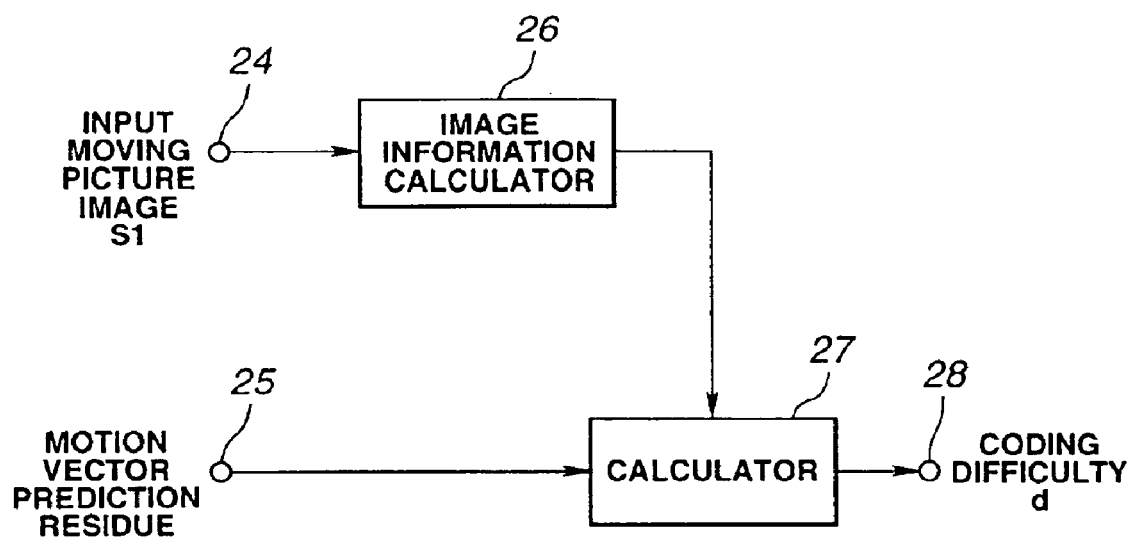
FIG. 6 is a block diagram showing a first configuration example of a coding difficulty calculator 13 of FIG. 5.

FIG. 6 is a block diagram showing a first configuration example of the coding difficulty calculator 13. A calculator 27 calculates a prediction residue of a motion vector, i.e., the total D1 of the Ef calculated by the aforementioned Equation (1) for each unit time and then involves the parameter indicating the coding deterioration remarkability, so as to output the coding difficult d=D1×α of the input image for each unit time.

An image information calculator 26, as a parameter indicating the coding deterioration remarkability, calculates a parameter indicating a flatness of the input image, for example, a dispersion value of the MB signal. In general, a coding noise is remarkable in a flat image portion for human eyes but cannot be easily distinguished in a complicated image portion. Based on this, as the image dispersion value increases, the value α is made smaller. On the contrary, as the image dispersion value decreases, the value α is made greater. Note that when an input image is coded within a frame (intra coding) by an image coding mode (not depicted), it is better to use as the aforementioned value D1, a total of the dispersion values of the MB signal calculated by the image information calculator 26 for each unit time.

Figure 7:
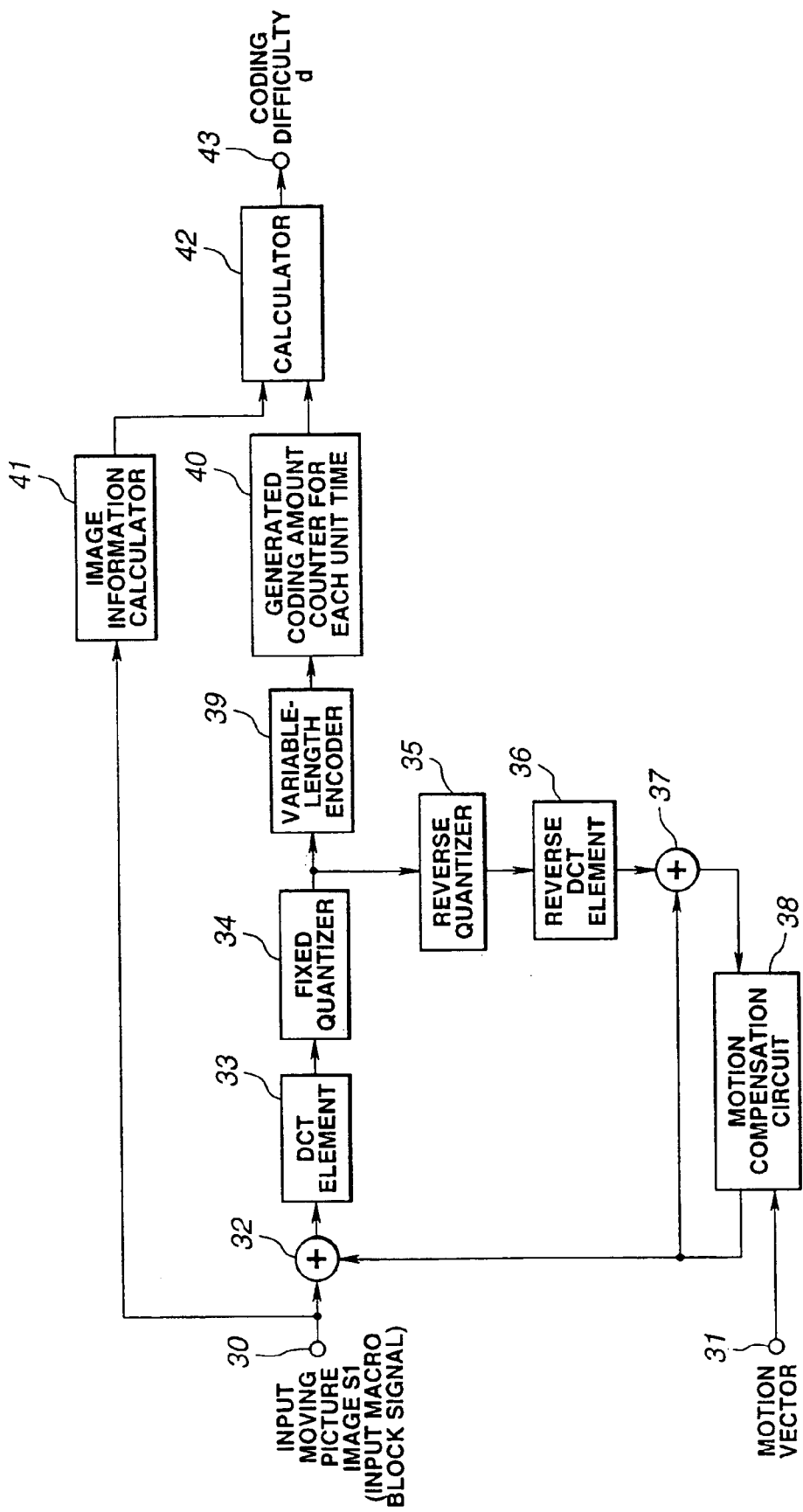
FIG. 7 is a block diagram showing a second configuration example of a coding difficulty calculator 13 of FIG. 5.

FIG. 7 is a block diagram showing a second configuration example of the coding difficulty calculator 13 of FIG. 5. This example employs a hybrid method using the motion compensative frame-to-frame prediction and the DCT in combination, in which a total D2 of generated bit amount for each unit time when the quantization step of the quantizer is fixed, so that the total D2 is modified by a parameter α indicating the coding deterioration remarkability, thus outputting the coding difficulty d=D2×α of the input image for each unit time, wherein the value a is identical as the one explained above.

The block diagram of FIG. 7 will be detailed below. An input image MB signal is supplied from a terminal 30 and its motion vector is supplied from a terminal 31. A motion compensation circuit 38 has an image memory from which a prediction MB signal is read out according to the motion vector. A calculator 32 carries out addition using the input MB signal from the terminal 30 as an addition signal and the aforementioned prediction MB signal from the aforementioned motion compensation circuit 38 as a subtraction signal, so as to obtain a difference between the input MB signal and the prediction MB signal. This difference is outputted as a prediction residue MB signal. It should be noted that when an image coding mode (not depicted) specifies to carry out an intra-frame coding of the input image, no prediction is carried out and the input MB signal is outputted as it is from the calculator 32. The aforementioned prediction residue MB signal (or the input MB signal if no prediction is carried out) is supplied to a DCT circuit 33. The DCT circuit carries out a 2-dimensional DCT to the aforementioned prediction residue MB signal. A DCT coefficient outputted from this DCT circuit 33 is quantized in a quantization circuit 34 with a predetermined fixed value of step size. This quantization circuit 34 outputs a quantized output signal which is supplied to a variable-length coding circuit 39 and a reverse quantization circuit 35. In the variable-length coding circuit 39, the aforementioned quantized output signal is subjected, for example, to Huffman coding. An output signal from this variable-length coding circuit 39 is supplied to a generated coding amount counter 40 where the total D2 of the generated coding amount is calculated for each unit time. On the other hand, in the reverse quantization circuit 35, the aforementioned quantized output signal is subjected to a reverse quantization according to the quantization step used in the quantization circuit 34. An output from the reverse quantization circuit 35 is supplied is supplied to a reverse DCT circuit 36 so as to be subjected to a reverse DCT processing and the prediction residue MB signal decoded is supplied to a calculator 37. This calculator 37 is also supplied with a signal identical to the prediction MB signal supplied to the aforementioned calculator 32. The calculator 37 adds the prediction MB signal to the aforementioned decoded prediction residue MB signal. Thus, an image signal partially decoded is obtained. The image partially decoded is stored in the image memory of the motion compensation circuit so as to be used as a reference image for the next motion compensation.

Figure 4:
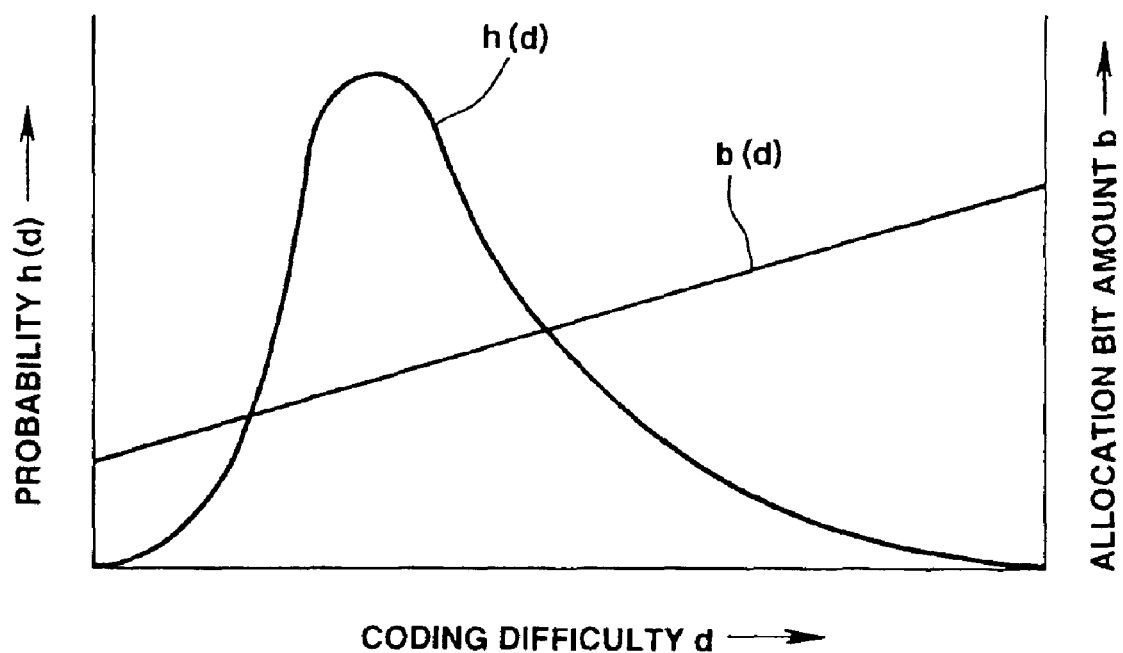
FIG. 4 shows an appearance probability h(d) of a coding difficulty d of an image per unit time length with in a reference moving picture sequence and a function b(d) which indicates an allocation bit amount b at a predetermined average bit rate for the coding difficulty d.

Next, the allocation bit amount calculator 14 of FIG. 5 calculates an allocation bit reference value 'b' for the coding difficulty 'd' of the input image for unit time. For example, in the aforementioned one-path type variable bit rate coding method, the coding difficulty for each unit time is related to the allocation bit amount when a reference motion picture image sequence is coded by way of variable bit rate coding with a predetermined average bit rate. According to this relationship, the allocation bit amount reference value b is outputted for the coding difficulty d calculated by the coding difficulty calculator 13. The relationship shown in FIG. 4 is more effective if switched between the input motion picture image types, for example, between a movie source and a camera video source.

The controller 15 of FIG. 5 modifies the allocation bit amount reference value 'b' from the allocation bit amount calculator 14 into an actual allocation bit amount 'bx' for output. The controller 15 controls the actual allocation bit amount 'bx' so that a total of generated bit amount generated when coding a moving picture image sequence of a time length which can be recorded on a signal recording medium be equal to or below a bit amount available in the signal recording medium available for recording the moving picture.

Explanation will be given on a specific example of algorithm in the controller 15 for modifying the allocation bit amount reference value 'b' into the actual allocation bit amount 'bx' with reference to a flowchart of FIG. 8.

Figure 8:
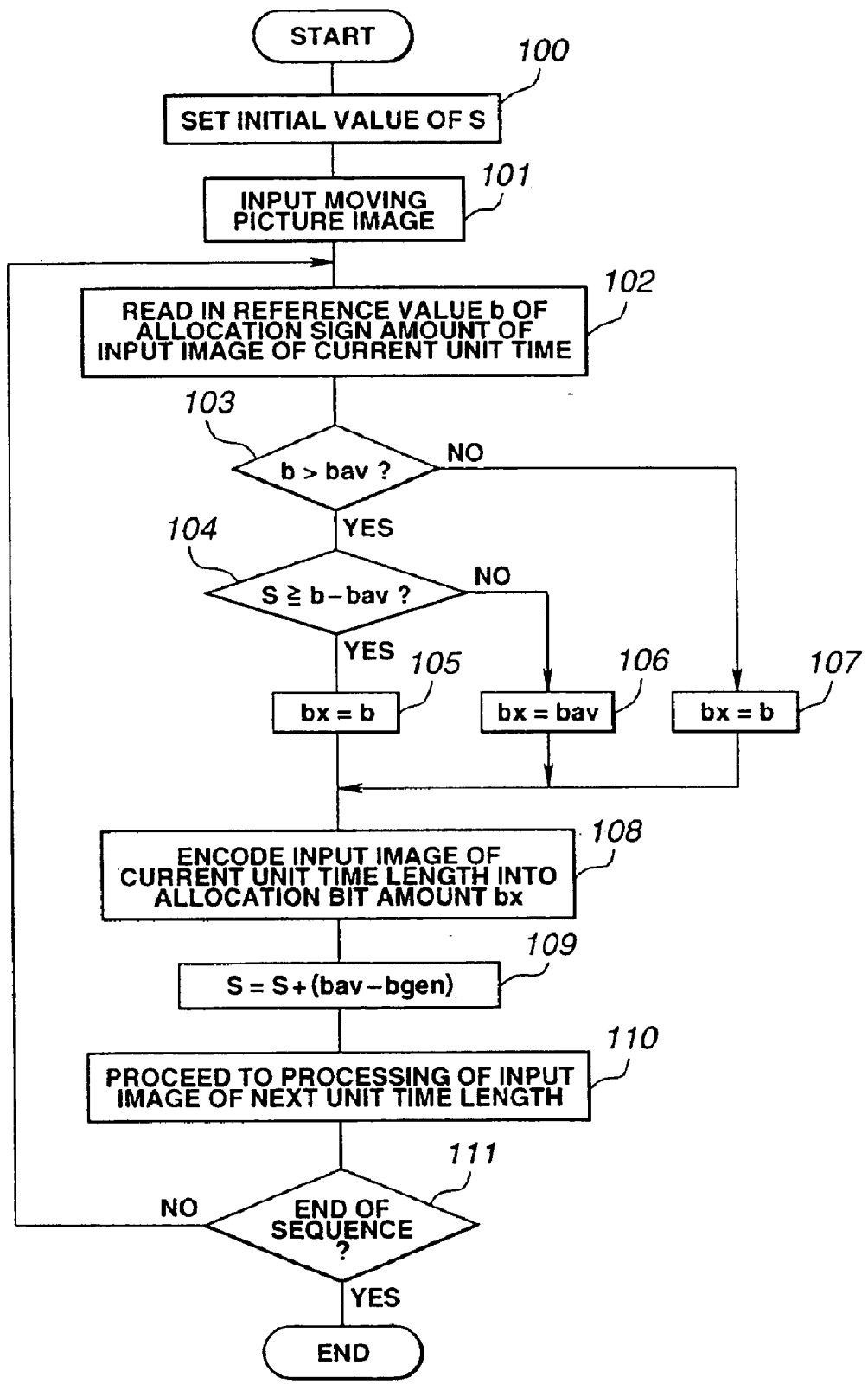
FIG. 8 is a flowchart showing an algorithm for modifying an allocation bit amount reference value 'b' supplied from an allocation bit amount calculator 14 of FIG. 5, into an actual allocation bit amount 'bx'.

In step 100 of FIG. 8, an initial value of the value S (=B av−B gen) is set, wherein B av is a total of the allocation bit amounts up to the current moment for coding an input moving picture with a constant bit rate R av; and B gen is a total of the generated bit amounts actually generated up to the current moment. Here, the R av is defined by R av=BV/T SEQ, wherein BV is a bit amount available in a signal recording medium for recording a moving picture and T SEQ is a time length of the moving picture sequence which can be recorded in the signal recording medium.

When recording a signal from the beginning on a new recording medium, S=0 is set, or if a predetermined size of margin is defined in the storage capacity of the recording medium, the margin amount is set as the initial value of S. Alternatively, when recording a signal on an empty area of a recording medium which has been already used, the last value S of the previous signal recording (or a value equivalent to S) is recorded on the recording medium, so as to be read out to be as the initial value for the signal recording this time.

In step 1-1, input of a moving picture image sequence is started. Next, in step 102, the controller 15 reads in the allocation bit amount reference value b of coding of the current unit time length of the input image, a value supplied from the allocation bit amount calculator 14 in FIG. 5.

Next, in step 103, the aforementioned allocation bit amount reference value b is compared to the average allocation bit amount b av=T GOP×BV/T SEQ, wherein BV is a bit amount available in the signal recording medium for recording the moving picture; T SEQ is a time length of the moving picture sequence which can be recorded on the signal recording medium; and T GOP is counted by the unit time length.

If the aforementioned allocation bit reference value b is greater than the average allocation bit amount b av (b>b av), control is passed to step 104. On the other hand, if the reference value b is equal to or smaller than b av, control is passed to step 107.

In step 104, if the value S is determined to be greater than the value (b−b av), i.e., if (S≧b−b av), control is passed to step 105. On the other hand, if the value S is smaller than the value (b−b av), then control is passed to step 106.

In step 105, the actual allocation bit amount bx, i.e., the value outputted from the controller 15 of FIG. 5 is set for the aforementioned reference value b (bx=b).

In step 106, the actual allocation bit amount bx is set for the b av (bx=b av), and in step 107 the actual allocation bit amount bx is set for b (bx=b).

After these steps 105, 106, and 107, control is passed to step 108. In step 108, the current unit time length of the input image is coded by the moving picture coding apparatus 18 so as to be the allocation bit amount bx. After completion of this coding, the coding bit amount b gen actually generated in the moving picture coding apparatus 18 is outputted to be supplied to the controller 15.

In step 109, the value (b av−b gen) is added to the aforementioned value S. That is, S=S+(b av−b gen).

In step 110, the unit time length of the input image is processed. Next, in step 111, it is determined whether the input of the moving picture image sequence is complete, i.e., whether the end sequence is reached. If yes, the coding processing is terminated. Otherwise, control is returned to step 102 to repeat the series of processes.

The controller 15 of FIG. 5, for example, carries out a processing according to the procedure of FIG. 8 and specifies the actual allocation bit amount bx to the moving picture coding apparatus 18.

The delay element 16 of FIG. 5 delays by a unit time the input of the input image S1 of the unit time length to the pre-filter 16. It should be noted that, in case when the coding difficulty calculator 13 has a configuration of the block diagram of FIG. 6, the delay element 16 may not be included.

The pre-filter 17 of FIG. 5, according to the processing information S5 from the controller 15, adaptively subjects the input image S2 to a low-pass filter processing and outputs a processed image S3. When the controller 15 is in the state of step 106 of the aforementioned flowchart of FIG. 8, i.e., when the coding difficulty of the input image of the unit time is comparatively high and the allocation bit amount reference value b is greater than the average allocation bit amount b av but the actual allocation bit amount bx is suppressed to b av, the processing information S5 is outputted for low-pass filter processing of the input image in the pre-filter 17 so that the coding deterioration becomes less remarkable. The contents of the processing information S5 are preferably are such that as the value (b−b av) increases, the low-pass filter processing has a narrower pass band. When the controller 15 is in the state of step 105 or step 107 of the flowchart of FIG. 8, the pre-filter 17 directly outputs the image S2 as S3.

It should be noted that in the block diagram of FIG. 5, the pre-filter is not indispensable, but its use enables to enhance the effect of making the coding deterioration less remarkable.

Figure 9:
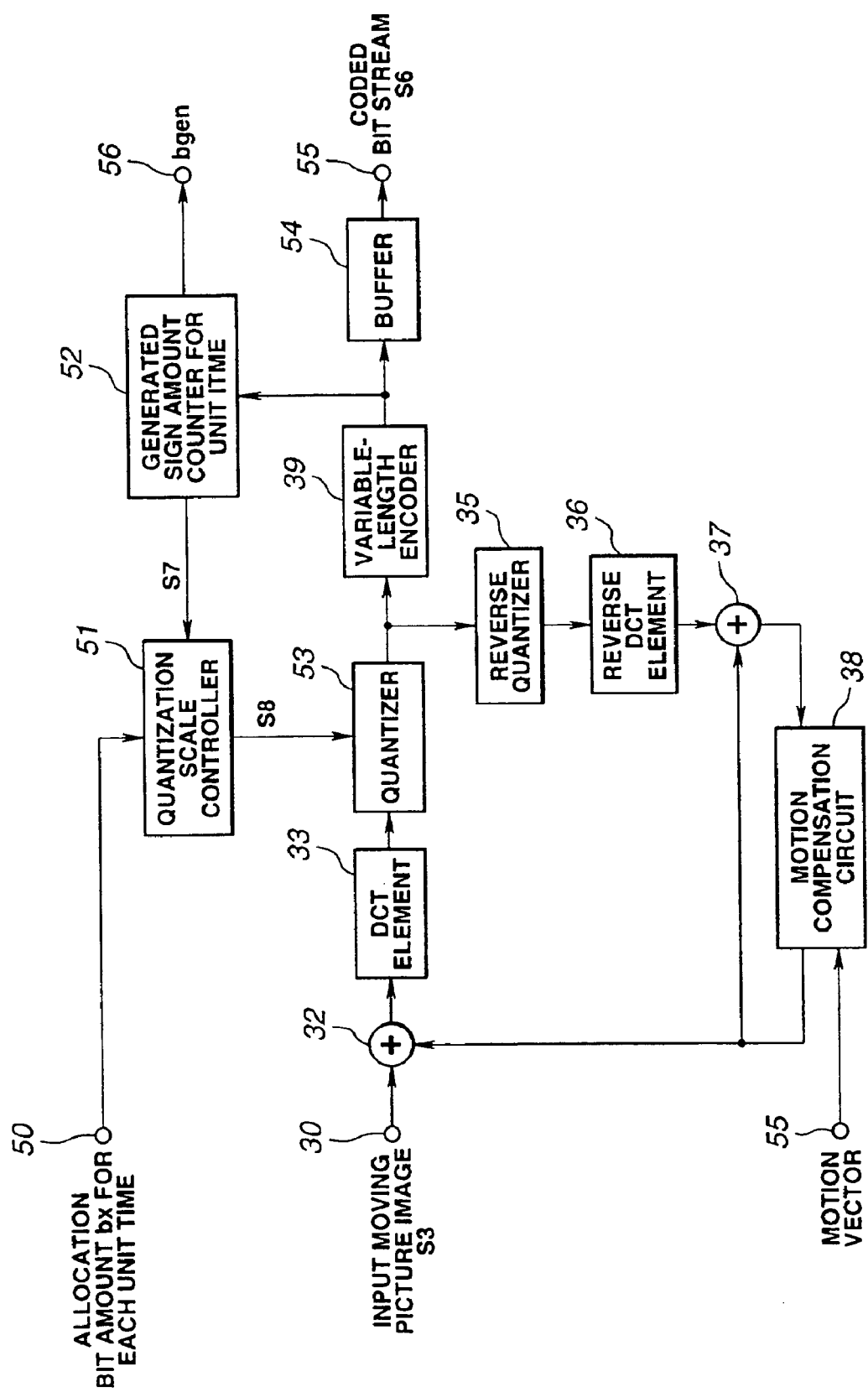
FIG. 9 is a block diagram showing a configuration example of a moving picture coding apparatus 18 of FIG. 5.

The moving picture coding apparatus 18 of FIG. 5 encodes the input image S3 so as to be the allocation bit amount bx. FIG. 9 is a block diagram showing a configuration example of the moving picture coding apparatus 18, in which most of the components are identical to those of the aforementioned coding difficulty calculator of FIG. 7. They are denoted with identical block numbers. Explanation will be given on the components which are different from those of FIG. 7.

The allocation bit amount bx is supplied from a terminal 50 and supplied to a quantization scale controller 51. A variable-length coding apparatus 39 outputs a bit stream for example based on the syntax of ISO/IEC 13818-2 (MPEG2 video). A generated sign amount counter 52 counts a sign amount outputted from the variable-length coding apparatus 39 within the unit time and supplies the count value S7 to the quantization scale controller 51. The quantization scale controller 51 outputs a quantization step S8 to a quantizer 53 so as to make the generated sign amount S7 for the unit time becomes equal to the allocation bit amount bx. The aforementioned bit stream is supplied to a buffer 54 and is read out from a terminal 55 at a predetermined bit rate. The generated bit amount b gen for the unit time is outputted from a terminal 56.

The coded bit stream S6 is outputted from a terminal 19 of FIG. 5. This bit stream is recorded on a signal recording medium and transmitted through a transmission path.

Figure 10:
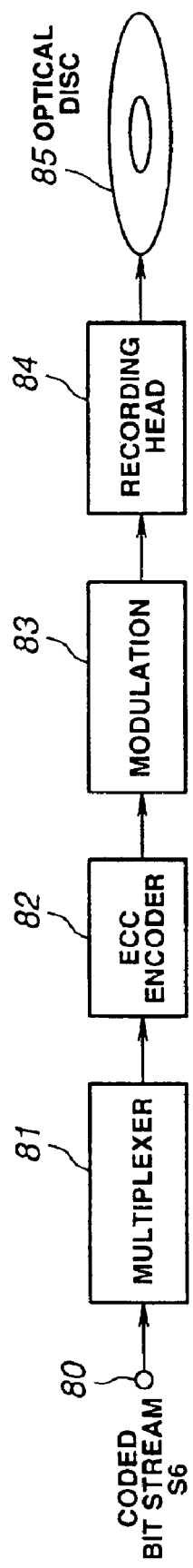
FIG. 10 is a block diagram showing a configuration for recording a coded bit stream onto an optical disc as an example of a signal recording medium.

FIG. 10 explains an example using an optical disc 85 as the signal recording medium. In this FIG. 10, a terminal 80 is supplied with the aforementioned bit stream S6. The bit stream S6 is supplied to a multiplexer 81. The multiplexer 81 multiplexes the bit stream S6 with a coded bit stream such as another audio signal (not depicted) by way of time division, so as to be in a single multiplexed bit stream. This multiplexed bit stream is added with an error correction code by an ECC encoder 82 and transmitted to a modulation circuit 83. In this modulation circuit 83, the output from the ECC encoder 82 is subjected to a predetermined modulation processing such as 8–14 modulation. An output from this modulation circuit 83 is transmitted to a recording head 84, so that the signal is recorded by this recording head on the optical disc 85.

It should be noted that in the example of FIG. 10, the signal recording medium is an optical disc, but the signal encoded by the apparatus of the present invention can also be recorded on a signal recording medium which is a tape-shaped recording medium such as a magnetic tape, or a magnetic disc medium such as a hard disc and a flexible disc as well as an IC card and various memory devices. Moreover, as the optical disc, various types of discs can be used: a disc for recording in pits and a magneto-optical disc, as well as a phase-change type disc and an organic pigment type optical disc, an optical disc for recording by an ultraviolet laser beam, an optical disc having a multi-layered recording film, and the like.

Moreover, the present invention is not to be limited to the aforementioned embodiments. For example, a digital signal processed is not limited to a moving picture video signal but can be applied to an audio signal and the like. The present invention can be modified in various ways within the scope of the invention.

According to the present invention, an allocation data amount is interrelated to a coding difficulty for each unit time standardized in advance from a general input signal of a type to which a particular input signal belongs, so as to obtain a coding difficulty of the input signal for each unit time, and for the coding difficulty of each unit time of this input signal, an allocation data amount reference value is obtained for each of the aforementioned interrelated unit time. The aforementioned allocation data amount reference value is modified into an actual allocation data amount, so that according to this actual allocation data amount, the input signal is coded for each of the unit time so as to create coded data. Consequently, it is possible to carry out a coding with an optimal allocation data amount according to the complexity of a signal at real time according to input of the signal.

The aforementioned example of modification of the allocation sign amount reference value into an actual allocation sign amount serves to that the total of generated bit amount generated when coding a time length of signal recordable in a recording medium is equal to or below a bit amount available in the recording medium for signal recording, thus controlling the actual allocation bit amount, which in turn guarantees that a predetermined time length of signal can be recorded on a recording medium having a predetermined storage capacity.

For example, when coding an input signal for each unit time with a predetermined allocation bit amount b av, the total B av of the allocation bit amount up to a current time is compared to the total B gen of the actually generated coding bit amount up to the current time, and if the value (B av−B gen) is positive, it is allowed to assign an allocation bit amount equal to or above the b av. Here, the b av is defined as follows: b av=T GOP×BV/T SEQ, wherein BV is a bit amount which can be used in the signal recording medium for recording a moving picture, T SEQ is a time length of the moving picture image sequence which can be recorded on the signal recording medium; and T GOP is given in a unit time length. Thus, it is possible to guarantee that a predetermined time length of signal can be recorded on a recording medium having a predetermined storage capacity.

According to the information used when modifying the aforementioned allocation data amount reference value into an actual allocation data amount, the input signal is subjected to a pre-filter processing and the processed signal is coded, thus enabling the signal coding deterioration to be made less remarkable. More specifically, when suppressing the aforementioned actual allocation amount below the allocation data amount reference value, the input image is subjected to a low-pass filter processing, thus enabling the image coding deterioration to be made less remarkable.

When carrying out a signal coding and recording of the coded signal on a recording medium in several times, the aforementioned value (B av−B gen) or a value equivalent to this is recorded on the recording medium, so that when recording a signal on an empty area of the recording medium next time, prior to the signal recording, the aforementioned value (B av−B gen) or the value equivalent to this is read out from the recording medium, according to which value the allocation bit amount for each unit time of input signal is calculated, thus enabling to effectively use the storage capacity of the recording medium.

Moreover, when the aforementioned input signal is a moving picture image signal, the aforementioned coding difficulty of the input image is determined according to the image characteristic information for each predetermined period of time, so that coding is carried out with an allocation sign amount reflecting the human visual characteristic from the image characteristic information, thus enabling to realize a high-efficiency moving picture image coding.

What is claimed is:

1. A signal coding method comprising the steps of:
   determining a coding difficulty for each unit time of an input signal;
   obtaining a reference value of allocation data amount interrelated with said coding difficulty of said input signal for said each unit time based on a standardized relationship between coding difficulty and allocation data amount, wherein said standardized relationship is based on a reference motion picture image sequence previously coded by way of variable bit rate coding with a predetermined average bit rate;
   modifying said reference value of said allocation data amount into an actual allocation data amount; and
   generating coded data by coding said input signal for said each unit time according to said actual allocation data amount,
   wherein said step of modifying said reference value of said allocation data amount into an actual allocation data amount is characterized in that a total B av of allocation bit amount up to a current time is compared to a total B gen of actually generated coding bit amount up to the current time while coding the input signal for each unit time with a constant allocation bit amount b av, and if a value (B av−B gen) is positive, it is allowed to assign an allocation bit amount equal to or above b av which is defined as follows:

$$b\ av = T\ GOP \times BV/T\ SEQ$$

wherein
   BV is a bit amount available in a signal recording medium for a moving picture recording;
   T SEQ is a time length of a moving picture sequence which can be recorded on a signal recording medium; and
   T GOP is a unit time length.

2. A signal coding method as claimed in claim 1, wherein said step of modifying said reference value of said allocation data amount into an actual allocation data amount is carried out by controlling an actual allocation bit amount, so that a total of a bit amount generated when a signal of a time length which can be recorded on a recording medium is equal to or below a bit amount available in the recording medium for signal recording.

3. A signal coding method as claimed in claim 1, wherein said input signal is subjected to a pre-filter processing according to an information used when modifying said reference value of the allocation data amount into an actual allocation data amount, and said signal processed is coded.

4. A signal coding method as claimed in claim 3, wherein said pre-filter processing carries out a low-pass filter processing to an input image when suppressing said actual allocation data amount below said reference value of the allocation data amount.

5. A signal coding method as claimed in claim 1, wherein when said input signal is a moving picture image signal, said coding difficulty is determined according to an image characteristic information of said input image for each predetermined period of time and coding is carried out with an allocation data amount reflecting human visual characteristic based on said image characteristic information.

6. A signal coding apparatus comprising:
   coding difficulty calculating means for determining a coding difficulty for each unit time of an input signal;
   means for obtaining a reference value of allocation data amount interrelated with said coding difficulty of said input signal for said each unit time based on a standardized relationship between coding difficulty and allocation data amount, wherein said standardized relationship is based on a reference motion picture image sequence previously coded by way of variable bit rate coding with a predetermined average bit rate;
   means for modifying said reference value of said allocation data amount into an actual allocation data amount; and
   coding means for generating coded data by coding said input signal for said each unit time according to said actual allocation data amount,
   wherein said means for modifying said reference value of said allocation data amount into an actual allocation data amount is characterized in that a total B av of allocation bit amount up to a current time is compared to a total B gen of actually generated coding bit amount up to the current time while coding the input signal for each unit time with a constant allocation bit amount b av, and if a value (B av−B gen) is positive, it is allowed to assign an allocation bit amount equal to or above b av, which is defined as follows:

$$b\ av = T\ GOP \times BV/T\ SEQ$$

wherein
   BV is a bit amount available in a signal recording medium for a moving picture recording;
   T SEQ is a time length of a moving picture sequence which can be recorded on a signal recording medium; and
   T GOP is a unit time length.

7. A signal coding apparatus as claimed in claim 6, wherein said means for modifying said reference value of said allocation data amount into an actual allocation data amount controls an actual allocation bit amount, so that a total of a bit amount generated when a signal of a time length which can be recorded on a recording medium is equal to or below a bit amount available in the recording medium for signal recording.

8. A signal coding apparatus as claimed in claim 7, said apparatus further comprising pre-filter means for a pre-filter processing to said input signal, which filter means carries out a low-pass filter processing to an input image when suppressing said actual allocation data amount below the reference value of the allocation data amount.

9. A signal recording medium on which a coded signal is to be recorded, wherein said coded signal is obtained by:
   determining a coding difficulty for each unit time of an input signal;
   obtaining a reference value of allocation data amount interrelated with said coding difficulty of said input signal for said each unit time based on a standardized relationship between coding difficulty and allocation data amount, wherein said standardized relationship is based on a reference motion picture image sequence previously coded by way of variable bit rate coding with a predetermined average bit rate;
   modifying said reference value of said allocation data amount into an actual allocation data amount; and generating coded data by coding said input signal for said each unit time according to said actual allocation data amount, wherein said step of modifying said reference value of said allocation data amount into an actual allocation data amount is characterized in that a total B av of allocation bit amount up to a current time is compared to a total B gen of actually generated coding bit amount up to the current time while coding the input signal for each unit time with a constant allocation bit amount b av, and if a value (B av−B gen) is positive, it is allowed to assign an allocation bit amount equal to or above b av which is defined as follows:

$$b\ av = T\ GOP \times BV/T\ SEQ$$

wherein

BV is a bit amount available in a signal recording medium for a moving picture recording;

T SEQ is a time length of a moving picture sequence which can be recorded on a signal recording medium; and T GOP is a unit time length.

10. A signal transmission method comprising:

determining a coding difficulty for each unit time of an input signal;

obtaining a reference value of allocation data amount interrelated with said coding difficulty of said input signal for said each unit time based on a standardized relationship between coding difficulty and allocation data amount, wherein said standardized relationship is based on a reference motion picture image sequence previously coded by way of variable bit rate coding with a predetermined average bit rate;

modifying said reference value of said allocation data amount into an actual allocation data amount;

generating coded data by coding said input signal for said each unit time according to said actual allocation data amount; and transmitting said generated coded data, wherein said step of modifying said reference value of said allocation data amount into an actual allocation data amount is characterized in that a total B av of allocation bit amount up to a current time is compared to a total B gen of actually generated coding bit amount up to the current time while coding the input signal for each unit time with a constant allocation bit amount b av, and if a value (B av−B gen) is positive, it is allowed to assign an allocation bit amount equal to or above b av which is defined as follows:

$$b\ av = T\ GOP \times BV/T\ SEQ$$

wherein

BV is a bit amount available in a signal recording medium for a moving picture recording;

T SEQ is a time length of a moving picture sequence which can be recorded on a signal recording medium; and T GOP is a unit time length.

11. A signal transmission method as claimed in claim 10, wherein said input signal is subjected to a pre-filter processing according to an information used when modifying said reference value of the allocation data amount into an actual allocation data amount, and said signal processed is coded.

12. A signal transmission method as claimed in claim 11, wherein said pre-filter processing carries out a low-pass filter processing to an input image when suppressing said actual allocation data amount below said reference value of the allocation data amount.

* * * * *